(12) United States Patent
Wang et al.

(10) Patent No.: US 8,165,041 B2
(45) Date of Patent: Apr. 24, 2012

(54) PEER TO MULTI-PEER ROUTING

(75) Inventors: Jim Jianping Wang, Dover, MA (US); Robert A. Lomme, Jr., Dracut, MA (US); Ransom L. Richardson, Beverly, MA (US); Thomas D. Sanfilippo, Somerville, MA (US)

(73) Assignee: Microsoft Corporation, Redmond, WA (US)

( * ) Notice: Subject to any disclaimer, the term of this patent is extended or adjusted under 35 U.S.C. 154(b) by 398 days.

(21) Appl. No.: 12/335,066

(22) Filed: Dec. 15, 2008

(65) Prior Publication Data

US 2010/0150157 A1 Jun. 17, 2010

(51) Int. Cl.
*H04L 12/28* (2006.01)
*H04L 12/56* (2006.01)

(52) U.S. Cl. .............. 370/255; 370/256; 370/390
(58) Field of Classification Search .......... 370/389, 370/390, 392
See application file for complete search history.

(56) References Cited

U.S. PATENT DOCUMENTS

| | | | | |
|---|---|---|---|---|
| 6,026,077 A * | 2/2000 | Iwata | ............... | 370/254 |
| 6,392,994 B1 * | 5/2002 | Dubuc | ............... | 370/230 |
| 7,133,928 B2 | 11/2006 | McCanne | | |
| 7,197,033 B2 * | 3/2007 | Reeves et al. | ........... | 370/389 |
| 7,353,252 B1 * | 4/2008 | Yang et al. | ........... | 709/204 |
| 7,363,342 B1 * | 4/2008 | Wang et al. | ........... | 709/204 |
| 7,707,410 B2 * | 4/2010 | Ishiguro et al. | ........ | 713/163 |
| 2002/0198959 A1 * | 12/2002 | Nishi et al. | ........... | 709/217 |
| 2003/0217171 A1 | 11/2003 | Von Stuermer | | |
| 2004/0054723 A1 * | 3/2004 | Dayal et al. | ........... | 709/204 |
| 2004/0243682 A1 * | 12/2004 | Markki et al. | ......... | 709/207 |
| 2006/0146991 A1 | 7/2006 | Thompson et al. | | |
| 2007/0076703 A1 * | 4/2007 | Yoneda et al. | ........ | 370/389 |
| 2007/0121503 A1 * | 5/2007 | Guo et al. | ............... | 370/230 |
| 2007/0133520 A1 | 6/2007 | Kakivaya et al. | | |
| 2007/0136480 A1 * | 6/2007 | Stephenson et al. | ..... | 709/227 |
| 2007/0276900 A1 | 11/2007 | Wang et al. | | |
| 2008/0005244 A1 * | 1/2008 | Vernon et al. | ........ | 709/204 |
| 2008/0126487 A1 * | 5/2008 | Wegenkittl et al. | ...... | 709/205 |

(Continued)

OTHER PUBLICATIONS

Simple Symmetric Transport Protocol (SSTP) Specification, Microsoft Corporation 2008, released Jun. 27, 2008, http://download.microsoft.com/download/1/6/F/16F4E321-AA6B-4FA3-8AD3-E94C895A3C97/%5BMS-GRVSSTP%5D.PDF, downloaded Oct. 10, 2008.

(Continued)

*Primary Examiner* — Chi Pham
*Assistant Examiner* — Farah Faroul
(74) *Attorney, Agent, or Firm* — Wolf, Greenfield & Sacks, P.C.

(57) ABSTRACT

A collaboration system using peer-to-multi-peer distribution of messages representing changes to a shared workspace. Each peer determines a distribution mechanism for messages to each of the target peers sharing the workspace. The selected distribution mechanism may depend on capabilities of a home relay associated with a peer initiating a message. Further, messages to subsets of the target peers sharing the workspace may be distributed using a session for each subset on which each message is sent only one time. The subset of target peers associated with some of the sessions may be selected so that target peers for which communication attempts have failed are grouped in the same session. In some scenarios, the initiating peer may provide multiple routing paths for target peers in a session and the home relay server may appropriately forward the message to the target peers, using one of the routing paths.

16 Claims, 7 Drawing Sheets

U.S. PATENT DOCUMENTS

| | | | | |
|---|---|---|---|---|
| 2008/0148379 | A1* | 6/2008 | Xu et al. | 726/11 |
| 2008/0198850 | A1 | 8/2008 | Cooper | |
| 2008/0205394 | A1* | 8/2008 | Deshpande et al. | 370/390 |
| 2008/0244532 | A1* | 10/2008 | Arcese et al. | 717/128 |
| 2008/0256553 | A1* | 10/2008 | Cullen | 719/313 |
| 2010/0085948 | A1* | 4/2010 | Yu et al. | 370/338 |

OTHER PUBLICATIONS

Enterprise Relay Server Version 3.1 Administrator's Guide, http://docs.groove.net/admin/ers/RelayServerAdministratorsGuide.pdf, Groove Networks, Inc., 2001-2005, downloaded Oct. 10, 2008.

Groove Relay Communications Protocols, http://technet.microsoft.com/en-us/library/cc262349.aspx, updated Apr. 1, 2008, downloaded Oct. 10, 2008.

Microsoft Office Groove Server 2007, http://www.diraction.ch/shopdocs/files/GrooveServer2007Guide.pdf, Mar. 2006, downloaded Oct. 10, 2008.

Lanubile, F., "A P2P Toolset for Distributed Requirements Elicitation," http://gsd2003.cs.uvic.ca/gsd2003proceedings.pdf#page=14, GSD'03 The International Workshop on Global Software Development, ICSE '03, International Conference on Software Engineering, Portland, OR May 9, 2003, pp. 12-15, downloaded Oct. 10, 2008.

Traversat et al., "Project JXTA 2.0 Super-Peer Virtual Network," http://www.di.unipi.it/~ricci/JXTA2.0protocols1.pdf, Project JXTA, Sun Microsystems, Inc., May 25, 2003, downloaded Oct. 10, 2008.

* cited by examiner

PEER TO MULTI-PEER ROUTING

BACKGROUND

Some computer systems use peer to multi-peer routing. One example of such a system is the Groove® peer-to-peer collaboration system, distributed by Microsoft Corporation. The system allows multiple users of networked computers to work cooperatively by sharing a workspace. The workspace may contain documents or other data that are used in a collaboration.

Components of the collaboration system on each user's computer maintain a copy of the shared workspace. Users may access tools that modify their copy of the workspace, such as by adding, deleting or editing documents or data. As a user makes changes to a copy of the shared workspace, components of the collaboration system on that user's computer generate messages identifying the changes. Those messages are sent to all other members of the workgroup sharing the workspace.

At the computers of the other users in the workspace, those change messages are received. Components of the collaboration system then apply the changes conveyed in the messages to the copy of the shared workspace. In this way, each user maintains a copy of the shared workspace and can experience any changes made by any other user.

In a peer-to-peer collaboration system, the change messages may be distributed using direct peer-to-peer communication. Additionally, such systems have included relay servers. When direct peer-to-peer communication was not possible, a peer initiating a message could send the message to a relay server, which would then relay it to the target peer. The relay servers could also store messages for peers that were not reachable. For example, a peer could go off line, but, upon coming back on line, could synchronize its copy of the shared workspace with other peers by downloading change messages stored on a relay server acting as its home relay server. A communication component of the peer-to-peer collaboration system determined the appropriate distribution mechanism for each message.

Some relay servers also assisted in the distribution of large messages. A peer could direct a large message to a relay server, which would then "fanout" the message by distributing it to multiple target devices.

SUMMARY

The inventors have recognized and appreciated that scalability of systems using peer-to-peer routing with an overlay relay network including relay servers can be improved through the use of routing mechanisms that supports single connection message distribution modes. Single connection distribution modes have an advantage in that they reduce the number of connections between peers and relay servers, and thus reduce network resource consumption. In single connection distribution modes, a peer sends a message to a home relay server along with an identification of target peers to receive the message. The home relay server can then distribute the message to the identified target peers, either directly or through home relays associated with each of the target peers.

In communicating with other relay servers, a home relay server supporting multiple sessions with an initiating peer or multiple initiating peers may multiplex messages received over those sessions into one connection with another relay server. The recipient relay server, acting as a home relay server for target peers to receive those messages, can then distribute the messages to the target peers.

Further efficiency may be achieved through improved error handling and message retransmissions. Distribution modes in some embodiments of the invention may support the aggregation into one session of target peers for which a message delivery has failed. An initiating peer communicating with multiple target peers may group the target peers into one or more sessions. When the initiating peer receives from its home relay server an indication of a failure in a session, it may regroup the target peers for which communication failed into separate sessions. As a result, the initiating target peer overall devotes less resources to processing delivery failure indications and retransmitting messages.

The system may support a communication protocol by which a peer can query its home relay server to determine whether the server supports single connection message distribution modes. An initiating peer can use the response from such a query in selecting a communication mechanism for messages. An initiating peer may perform a process of selecting a communication mechanism that includes using peer-to-peer communication for target peers that are reachable in that fashion. For those peers not reachable by using peer-to-peer communication, an initiating peer may select a communication mechanism involving its own home relay server or the relay server of one or more target peers. When supported by its home relay, an initiating peer may direct a message to its home relay server for distribution to multiple target devices. The home relay server may distribute the message directly to target peers or may direct the message to one or more home relay servers associated with target peers, from which the message is distributed to other target peers.

If the home relay server of an initiating peer does not support a single connection distribution mechanism in which the home relay distributes a message to multiple peers, an initiating peer may select another distribution mechanism.

The communication protocol between initiating peers and their home relays may allow an initiating peer to specify multiple paths to each target peer, which may include multiple home relays for each target peer. A home relay receiving such a message may select one of the paths for message distribution, using the others for fault tolerance in the event of a communication failure.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
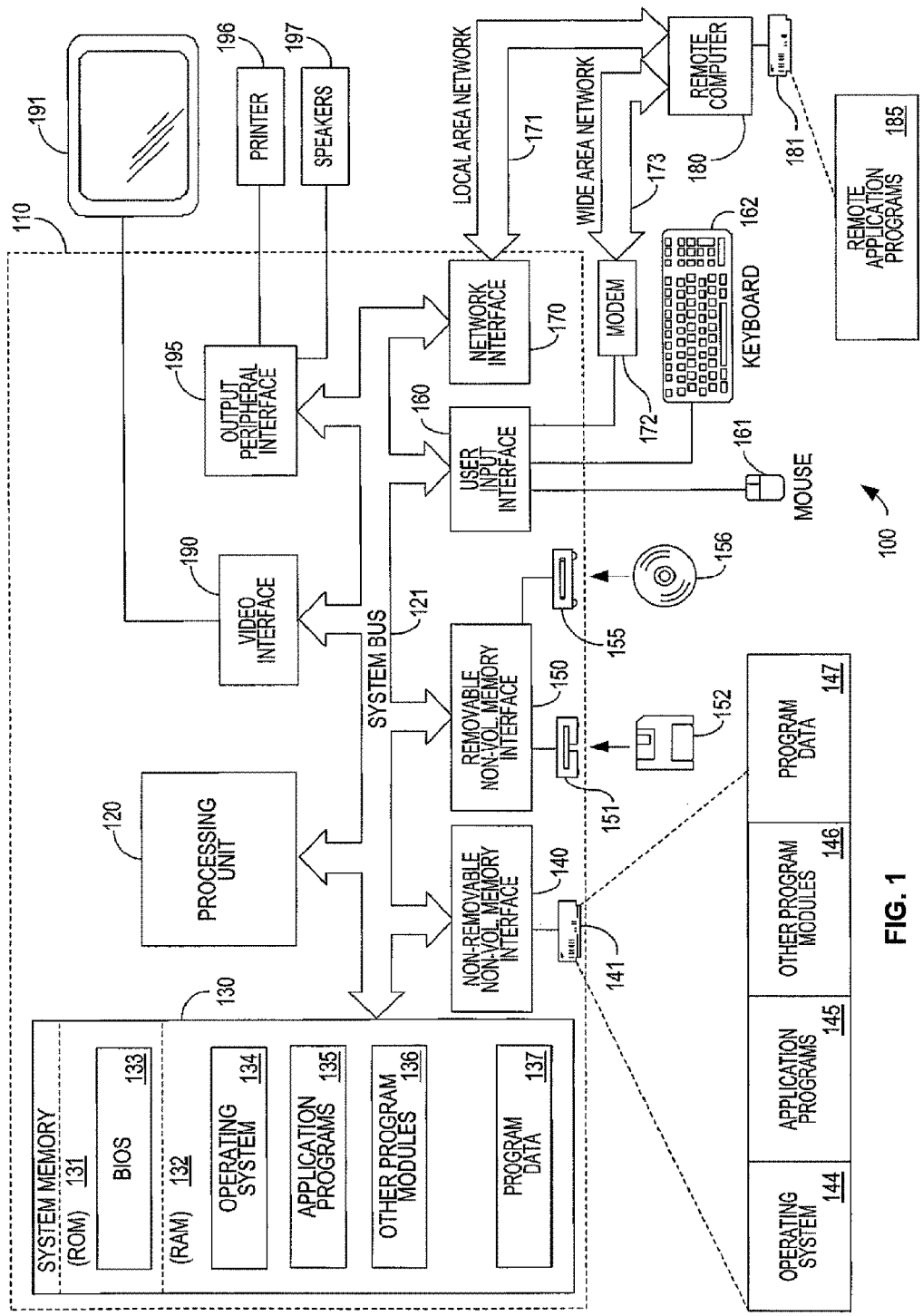
FIG. 1 is an illustration of a conventional computing device, illustrating an environment in which peer to multi-peer message routing may be performed.

To provide an improved performance of a system that employs peer to multi-peer message routing, peers initiating messages may be configured to select a communication mechanism for the messages they send. The communication mechanism may be selected to reduce server resources for the system or other parameters of communication. The selection may include choosing between peer-to-peer communications or routing through a relay that forwards messages to one or more target peers. In some embodiments of the invention, a target peer may be a particular "identity" or "user" participating in a collaboration session. The target, in some embodiments, may include this identity tied to a device, though in some embodiments, the target may be an identity regardless of the device in use by that identity.

If routing through a relay server is selected, a specific relay server may also be selected. Selection of a relay server may include choosing between initially sending a message to a home relay associated with the peer initiating a message or initially sending the message to a home relay server associated with one or more target peers. In instances in which multiple home relays are available, the selection may also include choosing between the multiple home relays which may be configured to act in a redundant fashion.

Some embodiments of a peer-to-peer collaboration system may support a variety of routing types. For example, some embodiments may support: direct peer-to-peer routing, direct relay routing, multiple-drop routing, single-hop routing, single connect direct routing, and single connect fanout routing. In direct peer-to-peer routing, an initiating peer may send a message directly to a target peer, without the involvement of any relay server. With direct relay routing, an initiating peer may send a message directly to a target peer's home relay server, which can then forward the message to the target peer. Multiple-drop routing may be used in situations in which multiple target peers share the same home relay server, and involves the initiating peer sending just one copy of a message directly to the target peer home relay server, which then forwards the message to each of the target peers. In single-hop routing, multiple target peers may not all share the same home relay. An initiating peer using single-hop routing may send one copy of a message to its home relay server, which then sends the message to any target peers for which it is also the home relay server. The home relay server may also forward one copy of the message to each of the home relay servers for the other target peers. The home relay servers for the target peers may then send the message to any target peers on their relay. Any failed target peers may be downgraded to use direct relay routing or multiple-drop routing. In single-connect direct routing, which may be used for sending a message to a single target peer, an initiating peer sends a message to its home relay server, which then forwards the message to the target relay server, which in turn forwards the message to the target peer. Single connect fanout routing may employ a similar message delivery mechanism as single-hop routing, but may also support improved failure handling and message retransmissions, as well as routing to redundant target home relay servers. In single connect fanout routing, multiple failed target peers may be aggregated into a separate single connect fanout routing session, while a single failed target peer may be separated into a single connect direct routing session.

A routing type may be selected for the messages. The available routing types may be based on the capabilities of a home relay server associated with an initiating peer, and accordingly, the system may incorporate a mechanism for each initiating peer to determine the routing capabilities of its home relay server. Though, at least some of the relay servers may be configured to perform operations that reduce the number of network connections that the server must maintain and/or the number of interactions required to distribute messages.

To reduce the number of connections between peers and relay servers, relay servers may be configured to support single connection routing types, such as single connect direct routing and single connect fanout routing. In such routing types, a single message is communicated from an initiating peer to its home relay server with sufficient information that the relay server may forward the message to multiple target peers, either directly or by sending the message to home relay servers associated with the target peers for further distribution. In instances where messages are forwarded to a target relay server for distribution, the initiating relay server may forward the message over a session, multiplexing the message with other messages received by the initiating relay server that are also to be forwarded to the target relay server. In some embodiments, the session may also be multiplexed with other sessions over the same connection between the initiating relay server and the target relay server. Unlike other routing types, such as multiple-drop routing or direct relay routing, in which an initiating peer creates connections between itself and each target relay server supporting target peers to which the initiating peer is sending a message, using single connection routing types, an initiating peer no longer creates connections with target home relay servers, but only a single connection with its own home relay server. Thus, the use of single connection routing eliminates connections between initiating peers and target home relay servers, and thus reduces the overall number of connections maintained by an overlay network formed by relay servers. The reduction in number of connections leads to a reduced use of computing resources on the relay servers.

Additionally, in some routing types, such as single connect fanout routing, an initiating peer may communicate to its home relay server multiple paths for sending messages to a target device. If communication failures occur on one path, the initiating relay server may select an alternative path, reducing the need for interactions with the initiating peer. To further reduce interactions between an initiating peer and its home relay server, the relay server may notify the peer when a communication failure occurs in a session established between the initiating peer and the relay server. To reduce the number of failure messages to which the initiating peer must respond the relay may group failures for multiple targets into one message. The initiating peer may regroup target peers into sessions, aggregating target peers for which communication failures have occurred, thereby reducing the number of copies of the failed message that must be resent.

The functions described above may be implemented in any suitable computing environment. However, FIG. 1 illustrates an example of a suitable computing system environment 100 that may be used in implementing some embodiments of the invention. For example, a computing system, such as computing system 100, may be programmed to act as either an initiating peer or target peer, performing the functions described below. Alternatively or additionally, a computing system, such as computing system 100, may be programmed to act as a relay server performing the functions as described below.

The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer storage media. Computer storage media can be any available storage media that can be accessed by computer 110 and includes both volatile and nonvolatile media, removable and non-removable media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Combinations of the any of the above should also be included within the scope of computer storage media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
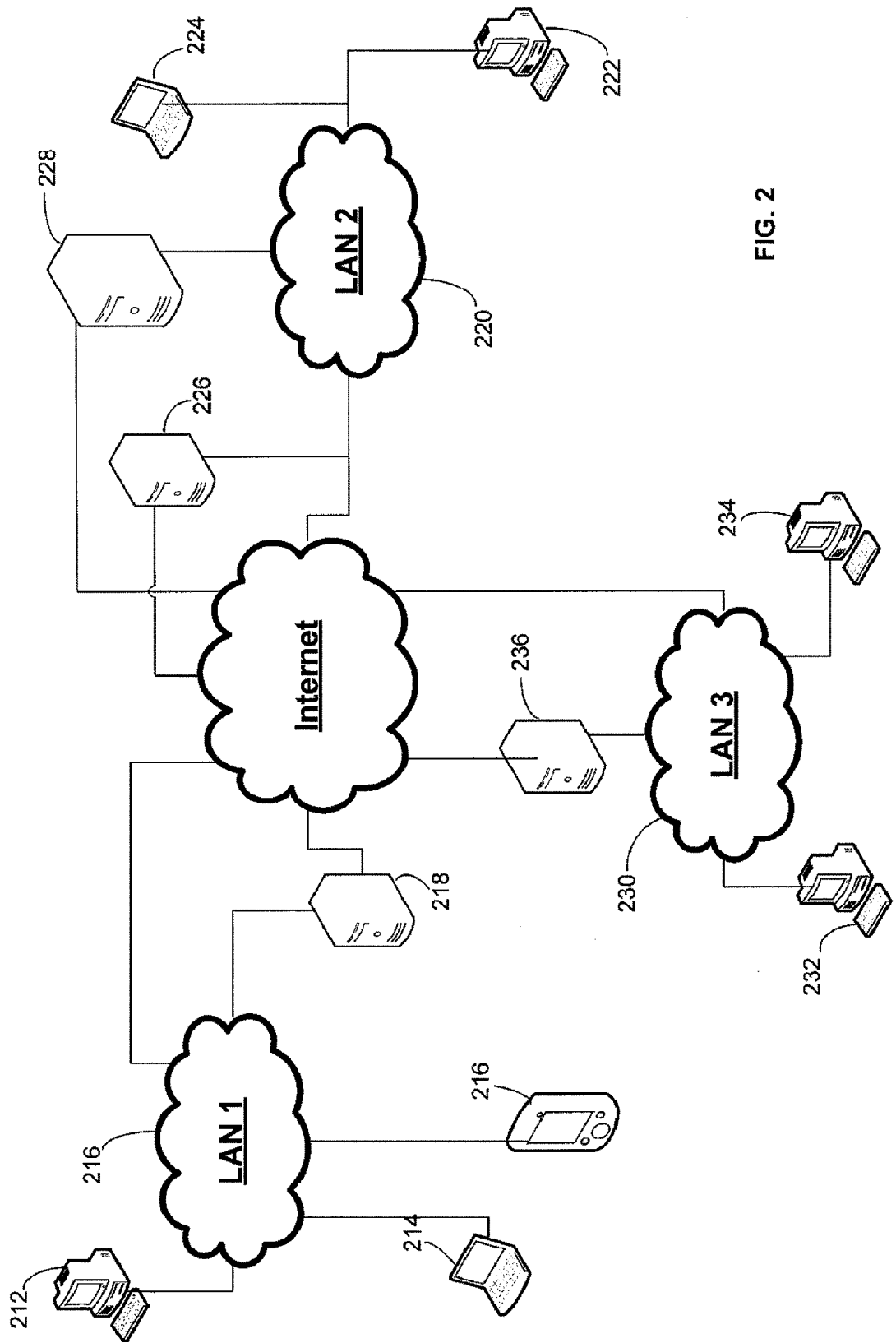
FIG. 2 illustrates an example of a computing system environment in which embodiments of the invention may be practiced.

FIG. 2 is a high-level architecture diagram of an environment in which the invention may be practiced. FIG. 2 illustrates an example of an environment which may support a communication system, in which multiple computing devices exchange messages with one another. An embodiment of the invention applies it to a peer-to-peer collaboration system. Approaches as described herein may provide low latency but also make good use of network bandwidth, and may therefore be well suited to collaboration systems. Though the invention is not limited to collaboration systems, and may be applied to any environment in which messages may be exchanged between computing devices.

In the peer-to-peer collaboration system illustrated in FIG. 2, multiple computing devices may exchange messages with one another. In a collaboration system, the messages may be related to synchronizing additions or updates to documents or data in a workspace shared among the communicating computing devices. However, as discussed above, the invention may be applied to any suitable communication system, and is not limited to a collaboration system with a shared workspace. The computing devices may be any suitable computing devices, such as a desktop computer, a laptop computer, or a PDA, capable of exchanging messages over a communications medium. In the example illustrated in FIG. 2 the computing devices include peers 212, 214, 216, 222, 224, 232, and 234. The peers may be connected to one another over one or more communications media. The invention may be applied to any suitable communications medium, including wired or wireless media. The communications media may be interconnected in any suitable way to form one or more computer networks. The computer networks may be public, such as Internet 200, or private, such as local area network (LAN) 210, 220, and 230. The computer network may be a TCP/IP network, though the network protocol used to convey messages is not critical to the invention and any suitable protocol may be used.

Some peers may belong to the same computer network as other peers. For example, peers 212, 214, and 216 all belong to LAN 210; peers 222 and 224 belong to LAN 220; and peers 232 and 234 belong to LAN 220. Peers may be able to establish a direct peer-to-peer connection with peers on the same computer network. Additionally, peers may be able to communicate with peers in other computer networks, if the computer networks are connected to one another through components that support such peer-to-peer connections. In the example illustrated by FIG. 2, LAN 210, LAN 220, and LAN 230 are each connected to Internet 100. As a result, peers belonging to different computer networks may communicate with each other. For example, peer 212 may communicate in a direct peer-to-peer connection with peer 224 via Internet 200.

As discussed above, the collaboration system may also include relay servers. A relay server is any suitable computing device configured to forward messages between peers or between peers and other relay servers over a suitable communications medium. A relay server may also be configured to store messages for a peer while it is unreachable or until a peer pulls the message from the relay server.

Each peer may be associated with one or more home relay servers. In the example of a peer-to-peer collaboration system as illustrated in FIG. 2, each peer may be assigned one or more home relay servers when it is configured for operation within the peer-to-peer collaboration system. Regardless of how peers are associated with home relay servers, a peer will generally be able to communicate with its home relay server, even if the network infrastructure or other factors preclude communication with other relay servers or other peers in the collaboration system. In some embodiments of the invention, a peer's home relay server may belong to the same computer network as the peer, although other embodiments of the invention are also envisaged. In the example illustrated in FIG. 2, peers 212, 214 and 216 are associated with home relay server 218, and peers 232 and 234 are associated with home relay server 236. In some instances, a home relay server will be located on the same local area network (LAN) as peers assigned to it. However, a relay server may not be on a LAN at all to increase the likelihood that other peers may communicate with the relay server. Thus, the relay server may be installed generally within the network cloud at any suitable location.

A peer may have more than one home relay server. For example, peers 222 and 224 each are associated with home relay servers 226 and 228. If a peer is associated with multiple home relay servers, the multiple home relay servers may be configured in any suitable way. In some embodiments of the invention, the multiple relay servers may be used for load balancing, in order to distribute an influx of messages across more than one relay server. In other embodiments, the multiple relay servers may be used for redundancy, so that if one relay server crashes or becomes unreachable, another home relay server may be used instead.

The presence of relay servers in a collaboration system provide opportunities for other types of routing in addition to direct peer-to-peer routing. A peer transmitting a message may select the routing type for the message. Though, in a peer-to-peer collaboration system in which multiple peers forming a work group may exchange numerous messages representing changes as a result of collaboration within a shared workspace, each peer may select different routing types for the messages. The routing types described in this application, however, may be applied to communications situations other than a shared workspace, including situations in which there is only one target peer.

A session may be implemented over a network connection. Before creating a session, two peers, a peer and a relay server, or two relay servers, may first exchange transport-related commands to establish a connection. Any suitable network transport may be used, including TCP/IP. After a connection is established, either side can initiate a session open command to create a new session for sending data. In some embodiments of the invention, sessions may be between endpoints, which represent a finer grained source or destination address within a device, whether the device is a peer device or relay server. In some embodiments, an endpoint is an indication of a unique triplet of information including a device, an application running on the device, and a user running the application. Each session may include all or a subset of the peers to receive change messages associated with a workspace. In embodiments supporting sessions, a routing type may be associated with the session and used for transmission of any subsequently generated messages for that session. In some embodiments, a session may include any intermediary destinations. For example, if using single connect direct routing, there may be at least three sessions: a first session from the initiating peer to its home relay server, a second session between the initiating peer's home relay server and a home relay server for the target peer, and a third session between the target peer and its home relay server. It is to be appreciated that any discussion of routing types as they are applied to peer devices or relay servers may equally be applied to endpoints, since an endpoint is, in some embodiments, an address with a finer degree of granularity.

More details of an exemplary routing type, multiple-drop routing, which may be supported in some embodiments of the invention, are described below. With multiple-drop routing, if a peer requires sending the same message to multiple peers, rather than sending each message individually to each peer in a direct peer-to-peer connection or using the direct relay routing, the initiating peer wishing to send the message could contact the home relay servers of the target peers. If multiple target peers share the same home relay server, the initiating peer could send the message data along with a list of target peers to the home relay server of the target peers. The home relay server of the target peers could then forward the message to each target peer in the target list with which the home relay server is associated. If the initiating peer wishes to send the message to target peers associated with different home relay servers, the initiating peer may send multiple copies of the message each to the home relay server for target peers that share the same home relay server.

As an illustrative example of multiple drop routing in the embodiment of FIG. 2, the peer 212 may wish to send a message to peers 224, 222, and 234. If using multiple-drop routing, peer 212 may send just two copies of the message: one copy to relay server 236, and another copy to relay server 228. Relay server, 236, as the home relay for peer 234, may then forward the message onto peer 234. Relay server 228, as the home relay server for peers 222 and 224 may forward the message to peers 222 and 224. In embodiments of the invention in which home relay servers 226 and 228 are configured to be redundant, peer 212 may alternatively send the message destined for peers 222 and 224 to relay server 226, instead of relay server 228.

Still other types of routing are possible. For example, in what will be referred to as single hop routing, an initiating peer may forward all messages through its home relay server. If peer 212 wishes to send the same message to peers 216, 222, 224, and 234, if it is using single hop routing, initiating peer 212 may send the message just once to its home relay server 218. An initiating peer may provide a list of target peers and path information for those target peers to its home relay server in conjunction with any session using single hop routing. The home relay server 218 may then forward the message to each home relay server for each target peer not associated with it. Because peer 216 is associated with home relay server 218, the same home relay server as initiating peer 212, home relay server 218 may forward the message directly to peer 216. Home relay server 218 may also forward the message to relay server 228, which in turn may forward the message to peers 222 and 224. Home relay server 218 may also forward the message to relay server 236, which in turn may forward the message to peer 234.

In embodiments of the invention in which an initiating peer may send a message to a relay server for forwarding to one or more target peers or to one or more target relay servers, the initiating peer and the relay server may each establish sessions. In some embodiments of the invention, the one or more initiating sessions between the initiating peer and the relay server may not have a one-to-one correspondence with the one or more forwarding sessions between the relay server and the one or more target peers or one or more target relay servers.

For example, if an initiating peer 212 wishes to send a message to multiple target peers 222 and 234 using single-hop routing, it may establish just one initiating session between itself and its home relay server 218. Its home relay server 218, on the other hand, may establish a forwarding session to each target relay server associated with a target peer. Thus, its home relay server 218 may establish a forwarding session with relay server 236, associated with target peer 234, as well as with relay server 228, associated with target peer 222.

In another example, an initiating peer 212 may wish to send multiple messages from different endpoints to a number of endpoints on target peers 232 and 234. In this example, if it is using single hop routing, it may establish a separate initiating session with its home relay server 218 for each endpoint. Its home relay server 218, however, may determine that all the target endpoints share a target home relay server, and may multiplex the multiple sessions into just one connection with the target relay server 236 containing the messages from and to all endpoints. Its home relay server 236 may then establish a forwarding session for each of target peer 232 and 234, in which each forwarding session has multiplexed multiple messages destined to each of the multiple endpoints on each target peer. While these examples in which the number of initiating sessions differs from the number of forwarding sessions are discussed in conjunction with single-hop routing, the situation may also apply to other routing types.

Variations of single hop routing may exist. Some embodiments may include another routing type known as single connect direct which may be used as an alternative to peer-to-peer routing or direct relay routing when an initiating peer wishes to send a message to a single target peer. In single connect direct routing, an initiating peer may send the message to its home relay server. Its home relay server may then forward the message to the target peer's home relay server. For example, if peer 214 desires to send a message to peers 222 using single connect direct routing, it may send just one copy of the message to its home relay server 218. Home relay server 218 may then forward the message to target peer 222's home relay server, which as illustrated in FIG. 2, corresponds to either relay server 226 or relay server 228.

Other embodiments may include still another variation of single hop routing, known as single connect fanout routing, which provides support for redundant target home relays, alternative routing paths and improved error handling and message retransmissions. When an initiating peer uses single connect fanout routing, it proceeds as with single hop routing. However, if the message fails to be delivered to a single target peer, the initiating peer may remove the failed target peer from the original list of target peers, and use single connect direct routing for that one failed target peer, while it continues to use single connect fanout routing on the other target peers. If communication fails to be delivered to more than one target peer, the initiating peer using single connect fanout routing may remove all the failed target peers from the original list of target peers, and place all the failed target peers into a separate new single connect fanout routing session. By way of contrast, if a single target peer fails while using multiple drop routing or single-hop routing, the failed target peer may be downgraded to use direct relay routing; multiple failed target peers may be downgraded to use multiple-drop routing, placing an additional load on the home relay server of the failed target peer. Separating any failed target peers to groups may lead to improved performance and simplified communication for the successful peers. Because an initiating peer receives an indication of a communication failure for each session in which a failure occurs, reducing the number of sessions for which an initiating peer receives communication failure indicators may also reduce the number of communication failure indications to which an initiating peer needs to respond. Further, because an initiating peer may maintain information about failed communications until the communication failure is resolved, reducing the number of sessions experiencing communication failures may also reduce resource usage on each initiating peer. The improved performance associated with the aggregation of failed target peers may result from handling multiple failed target peers once, and resending the messages to the failed target peers once. Accordingly, though aggregation of peers for which communication has failed is described in connection with single connect fanout routing, the approach of aggregating target peers for which communication failures have occurred may be employed when possible in response to indications of communication failures associated with any other suitable type of fanout routing.

Single-connect fanout routing may provide other advantages in some embodiments. In conjunction with a list of target peers, an initiating peer may send path information for the target peers such that the relay server can appropriately direct messages to the target peers. The path information may include network addressing and other routing information to enable communication with a target peer. In addition, the path information may identify one or more home relay servers associated with each target peer in the list of target peers. The list of target peers and path information may be provided at the time the initiating peer establishes a session with its home relay server and then may be used in connection with subsequent messages sent using that session. However, the list of target peers and path information may be provided at any suitable time and in any suitable manner.

In some embodiments of the invention, the path information associated with a list of target peers may identify multiple paths by which a message can be sent to a target peer. This information may be used by a relay server to alter the path it uses to forward a message to a target peer. A relay server may select an alternative path in a scenario in which a communication failure occurs. For example, if a message fails to be delivered to a target peer using a first path, a relay server may try delivering the message via one or more alternative paths, if they are specified, until the message is delivered successfully or the list of alternate paths is exhausted. Any suitable algorithm may be used to determine the order in which paths are tried and the number of retry attempts for each path. Though, in some embodiments, the order in which paths are tried may be selected to reduce one or more parameters of communication associated with loading on a network or network device. For example, the paths may be selected to reduce the number of messages sent by the relay server, the number of connections maintained by the relay server or the number of sessions maintained by the relay server. For example, if a home relay server has established a session with a target relay server to support single connect fanout routing, the home relay server may preferentially select an alternative path including a different target relay server supporting the same target peer if the previous target relay server becomes unavailable.

The routing types described above are not exhaustive, and more routing types could be envisaged in other embodiments of the invention. Furthermore, not all embodiments of the invention may support all the routing types described above. For example, some relay servers may not support single connect direct and single connect fanout routing, since it offloads much of the message handling from the peers to the relay servers. In some embodiments, some relay servers may support more routing types than others. In these embodiments, the initiating peer or the home relay of the initiating peer may query the capabilities of a target's home relay server to determine what type of routing it may support.

Figure 3:
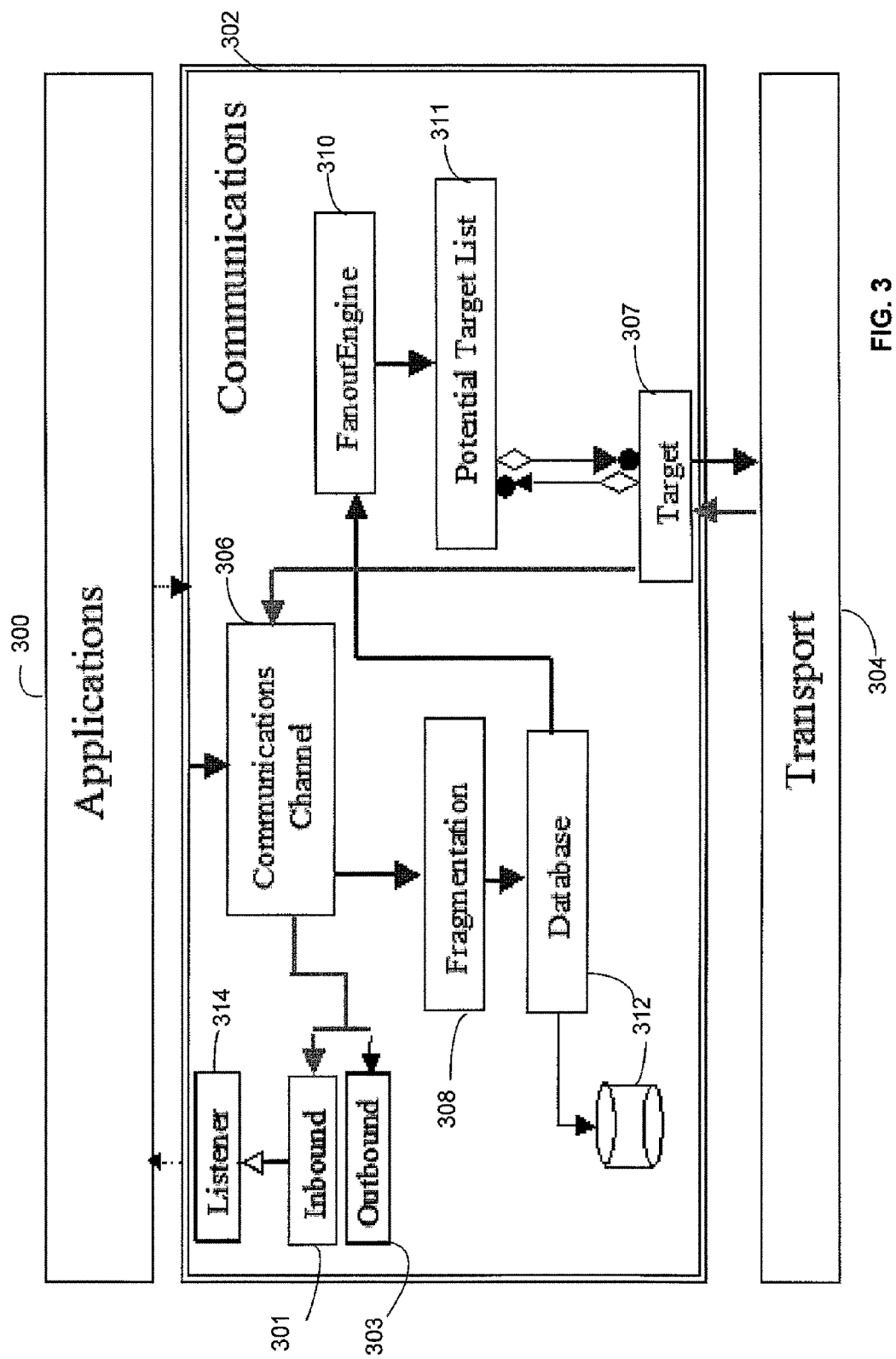
FIG. 3 is an example of an architecture for implementing the collaboration system on a peer device.

FIG. 3 illustrates an embodiment of an architecture for implementing components of the collaboration system on a peer device. The functionality ascribed to components in the architecture illustrated in FIG. 3 may in some embodiments be ascribed to fewer components or a greater number of components. Some of the components illustrated in FIG. 3 are conceptual in nature, and may not correspond to actual components in a software architecture. At a high level, the architecture includes one or more collaboration applications 300, which may receive inbound messages 301 and generate outbound messages 303 via a communications manager 302. These messages may represent changes to a shared workspace and applications 300 may represent software applications, such as word processors, that can be used to manipulate data in the shared workspace. Communications manager 302 may execute a communications protocol to establish a communication channel 306 between applications 300 and target peers. Target peer path 307 illustrates one possible routing path to a target peer. The messages may be communicated over a transport 304, but communications manager 302 is responsible for intelligently routing the messages. The communications manager 302 may direct the transport layer 304 to perform message multiplexing, application layer multicasting, establish connections and sessions, and send messages. The communications manager 302 passes inbound messages to a "listener component" 314, which forwards incoming messages to appropriate applications. Thus, in some embodiments of the invention, much of the intelligence in the collaboration system, including the routing decisions, may be within the peer device itself.

The applications 300 may be any type of application that could interact with the shared workspace. The applications 300 may provide, for example, simultaneous editing of documents such as a spreadsheet, software source code or a virtual white board. Though the form of interface between applications 300 and communications manager 302 is not critical to the invention, in some embodiments, the applications 300 may have knowledge of specific interfaces provided by the communications manager 302, while in other embodiments, the applications 300 may have no specific knowledge of the existence of the communications manager 302, which may use standard interfaces to communicate with the applications 300. Regardless of the nature of the application, applications 300 may generate message content, which in the example of a peer-to-peer collaboration system constitute changes to a shared workspace.

In addition to receiving message content defining changes to a shared workspace, communications manager 302 may receive a set of endpoints identifying target peers to receive messages indicating changes to a shared workspace. The set of endpoints may contain information identifying each target peer to receive messages communicating changes to the shared workspace. In conjunction with an identification of the target peer, the set of endpoints may include path information, identifying paths over which such messages may be sent. The path information may include network address information and other information that may be used in sending a message to the target peer, either using peer-to-peer communication or routing through a relay server. A fanout engine 310 may check each destination endpoint in the set of endpoints, and may break up the set of endpoints into several groups. Each group of endpoints, as well as a list of target peer devices or target relay servers, may form a potential target list 311. Each potential target list 311 corresponds to a set of potential ways to reach a given target peer. As will be described in greater detail below, the information in potential target list 311 may be used by the fanout engine 310 to determine a routing type to send messages to each target peer on the potential target list 311. Combining peer devices with home relay servers into one potential target list allows routing types not involving relay servers, such as direct peer-to-peer routing, to be implemented seamlessly with routing types making use of relay servers, such as direct relay routing or single connect fanout routing. Additionally, the information in potential target list 311 may be used to identify alternative paths for reaching a target peer.

In some embodiments, the communications manager 302 may include a fragmentation engine 308. Fragmentation engine 308 may be a component implemented in software that fragments large outbound messages into smaller ones for more efficient transmission. For inbound messages, fragmentation engine 308 may reassemble fragmented messages into their original form.

The communications manager 302 may decide how to deliver outbound messages representing changes to the shared workspace made by applications 300. Using a fanout engine 310, which may be a component performing processing in software, the communications manager 302 may implement one or more routing algorithms. Fanout engine 310 may select a primary path from among multiple paths provided by applications 300 along with the messages. Additionally, fanout engine 310 may select a routing type for messages to each target peer. In the embodiment illustrated, fanout engine 310 may select from among the routing types described above in conjunction with FIG. 2. When selecting routing types, the fanout engine 310 may take into consideration the following criteria: optimizing network throughput, minimizing delivery time, and reducing network resource consumption. However, any suitable communication criteria may alternatively or additionally be determined by fanout engine 310.

Fanout engine 310 may also define one or more sessions for use in communicating messages representing changes to the shared workspace made by applications 300. Each session may be used for communicating messages to a subset of the target peers. The target peers associated with each session may be selected based on whether they are reachable via a message sent to the same endpoint. For example, target peers reachable through a message sent to the same target relay server may be grouped in one session while target peers reachable only through a different target relay server may be grouped in a different session. The communications manager 302 may also store outbound messages until their delivery has been acknowledged. In an embodiment of the invention, outbound unacknowledged messages may be stored in database 312, although any suitable computer storage medium may be used.

Figure 4:
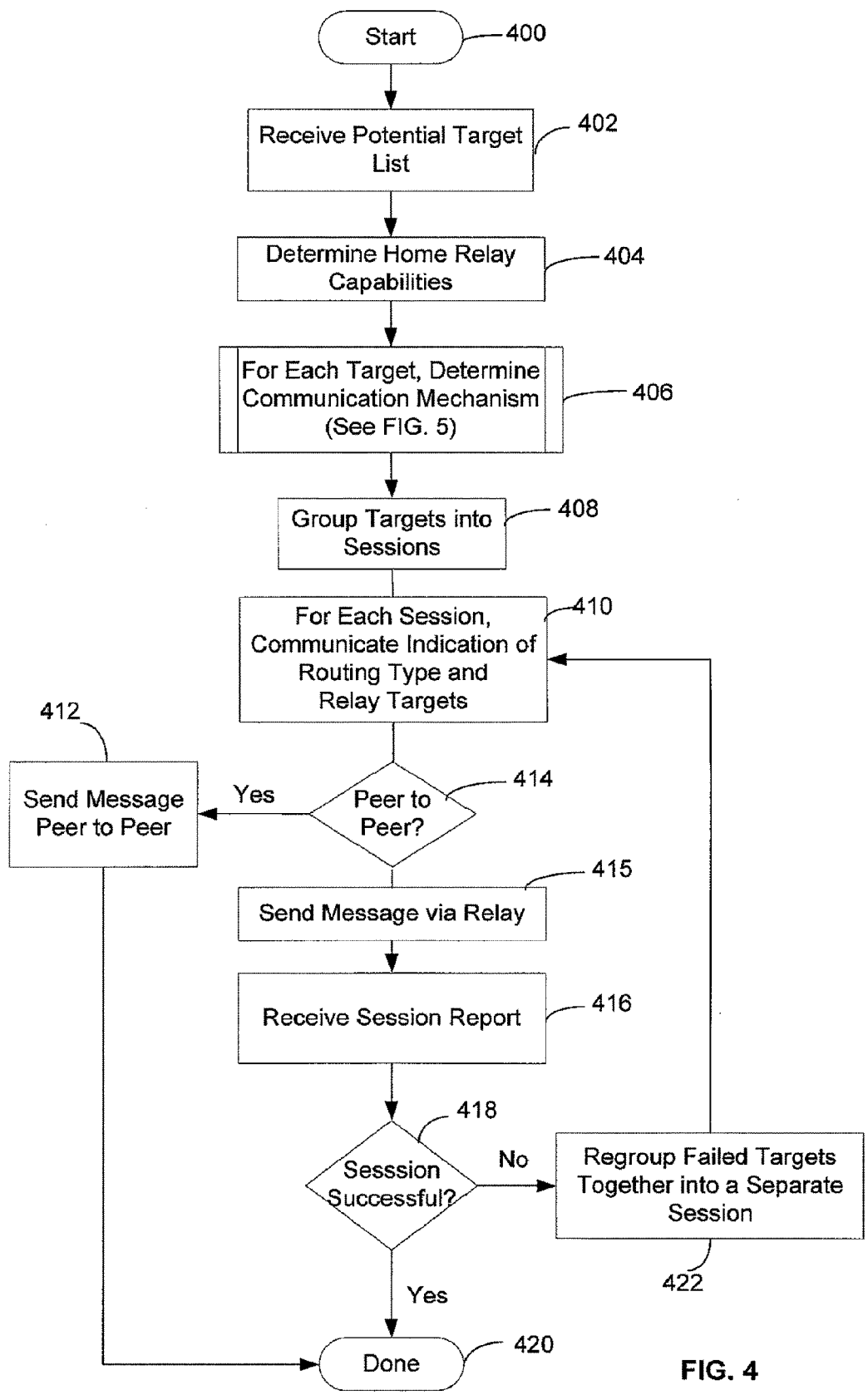
FIG. 4 illustrates a high-level flow chart for a method of sending a message from an initiating peer to a number of target peers.

FIG. 4 illustrates a high-level flow chart for a method of communicating messages from an initiating peer to a number of target peers, including making appropriate routing decisions. Process 400 illustrated in FIG. 4 may begin at any suitable time. For example, the process may be initiated upon creation of a shared workspace or changes to the members who have access to a shared workspace or at any time that the potential target list 311 (FIG. 3) associated with the shared workspace changes. Accordingly, process 400 of FIG. 4 may be performed separately for each application or each shared workspace created on a peer that is part of a peer-to-peer collaboration system.

Regardless of the reason for initiating process 400, in the embodiment illustrated process, 400 starts at block 402, at which point the initiating peer creates a potential target list from information received from applications or associated with the initiating peer device. The receipt of the list may be from any suitable source. For example, an application, such as applications 300, may generate a potential target list. Alternatively, or additionally, the potential target list may be generated by components of the collaboration system executing on the initiating peer. The components may track members of a collaboration session that should receive change messages in connection with a shared workspace, and they may track the peer devices in use by the members. The initiating peer may try to send messages to a potential target from the potential target list in a certain order.

If a potential target is a home relay, at block 404, the initiating peer may query its home relay to determine the capabilities of the home relay for supporting different routing types. As a specific example, a peer-to-peer collaboration system in accordance with some embodiments may include newer relay servers that support all routing types and older relay servers that do not support single-connect fanout routing and/or single-connect direct routing. In such an embodiment, processing at block 404 may determine whether these routing types are supported. The initiating peer may do this using any suitable means, including sending a special query command to the home relay and receiving a response, in which the response may be in any suitable form. For example, the response may indicate either a version number, or a set of routing algorithms the home relay supports. In other embodiments of the invention, the initiating peer may determine the capabilities of the home relay server by attempting to use a particular routing type and, based on the type of behavior exhibited by the home relay server, make a determination whether or not that routing type is supported by the home relay server. As another example, an initiating peer may determine routing types supported by its home server by access to information previously stored on the initiating peer or other suitable data store.

Regardless of how the potential target list is obtained, for each target in the potential target list, the initiating peer then determines, in block 406, the communication mechanism for sending messages to the target. More details of this step are provided in FIG. 5, but, in brief, this step includes determining which routing type the initiating peer will use to transmit messages to the target. When making routing decisions, the initiating peer may take into account a number of considerations in various embodiments. For example, if the potential target is a target peer device, an initiating peer may select direct peer-to-peer routing. On the other hand, if potential target is a relay server, the initiating peer may select direct relay routing, multiple-drop routing, single hop routing, single connect direct routing, or single connect fanout routing. Other considerations may include the capabilities of its home relay server, the message size, peer online status, the number of target peers, network speed, and bandwidth usage. Determining a communication mechanism may also include selection of a primary path for sending messages and may include selection of alternative paths.

The initiating peer, in block 408, may then group the target peers into one or more sessions. Targets may be grouped according to various considerations, including whether or not they share a home relay server and the routing type selected. Once the target peers are grouped into sessions, those sessions may be established through communication with the opposing endpoint of the session. For example, for sessions using a peer-to-peer routing type, the opposing endpoint is the target peer, and the session may be established by messages sent over a network connection to that target peer. For routing types that involve sending messages to a relay server, the relay server may be the opposing endpoint and the session may be established using communication over a network connection to the relay server. The information communicated as part of establishing a session may depend on the routing type used for that session. For example, for sessions using single connect fanout routing or single connect direct routing, a relay server that is the endpoint for a session may receive information about where to send forwarded messages. The information establishing a session may also include information notifying the opposing endpoint of the routing type to be used in that session so that the opposing endpoint may appropriately process received messages. Accordingly, at block 410 for each session established by an initiating peer, an indication of routing type and, for routing types that include forwarding messages to other targets, the relay targets, is communicated to the opposing endpoint.

The processing at blocks 402, 404, 406, 408 and 410 may be performed at any suitable time. In the example illustrated, this processing is performed as part of establishing a session. The processing in blocks 414, 416, 418, 422 and 412 may be performed as messages are generated for transmission over the session.

In some embodiments, the initiating peer may first always try to send the message using a direct peer-to-peer connection, whenever possible. In block 414, the initiating peer checks whether it can use a direct peer-to-peer connection to send the message. If so, in block 412, it may send the message using a direct peer-to-peer connection, at which point it may proceed to block 420, as it may be done sending the message. Direct peer-to-peer communication may be performed in any suitable fashion, including technology as is known in the art.

Conversely, if processing at block 414 determines that direct peer-to-peer communication is not available, an alternative routing type may be used to communicate the message as determined at block 406 for the session. Accordingly, in block 415, the initiating peer may then send the message using another communication mechanism.

In step 416, the initiating peer may receive a session report from the home relay of the initiating peer indicating whether or not communication for the session was successful. In step 418, the initiating peer makes a determination based on the session report of the success of the session. If it was successful, the initiating peer may have finished sending the message, and the flow chart proceeds to block 420 where process 400 ends. As part of ending a process of sending a message, the initiating peer may remove copies of the message it has stored for error handling in response to a communication failure.

If the session was not successful, the process proceeds to block 422. In addition to any error handling, such as attempts to retransmit the message, a regrouping of target peers may be performed. The regrouping may aggregate target devices for which communications have failed into separate sessions. As a result, there may be one or a small number of sessions on which further communication failures occur. The processing at block 422 may include removing from the current session any targets to which it failed to deliver the message, placing any failed targets into a separate session. As discussed in conjunction with FIG. 2, this may have the advantage of improving the performance, simplifying the processing of the successful targets, and reducing the number of message retransmissions. The method then may loop back to block 410 where the new sessions are communicated to the opposing endpoints of the sessions. The steps performed at block 410 when the process loops back following a communication failure may be the same as initially performed at block 410. Alternatively, only a subset of the steps may be performed at block 410.

As noted above, processing at block 406 may involve determining for each target a communication mechanism, including a routing type. In accordance with some embodiments of the invention, single connection routing types, such as single connect direct routing and single connect fanout routing may be preferentially used when peer-to-peer routing is unavailable. Any suitable process may be used to select the routing type. However, FIG. 5 provides an example of a suitable process.

Figure 5:
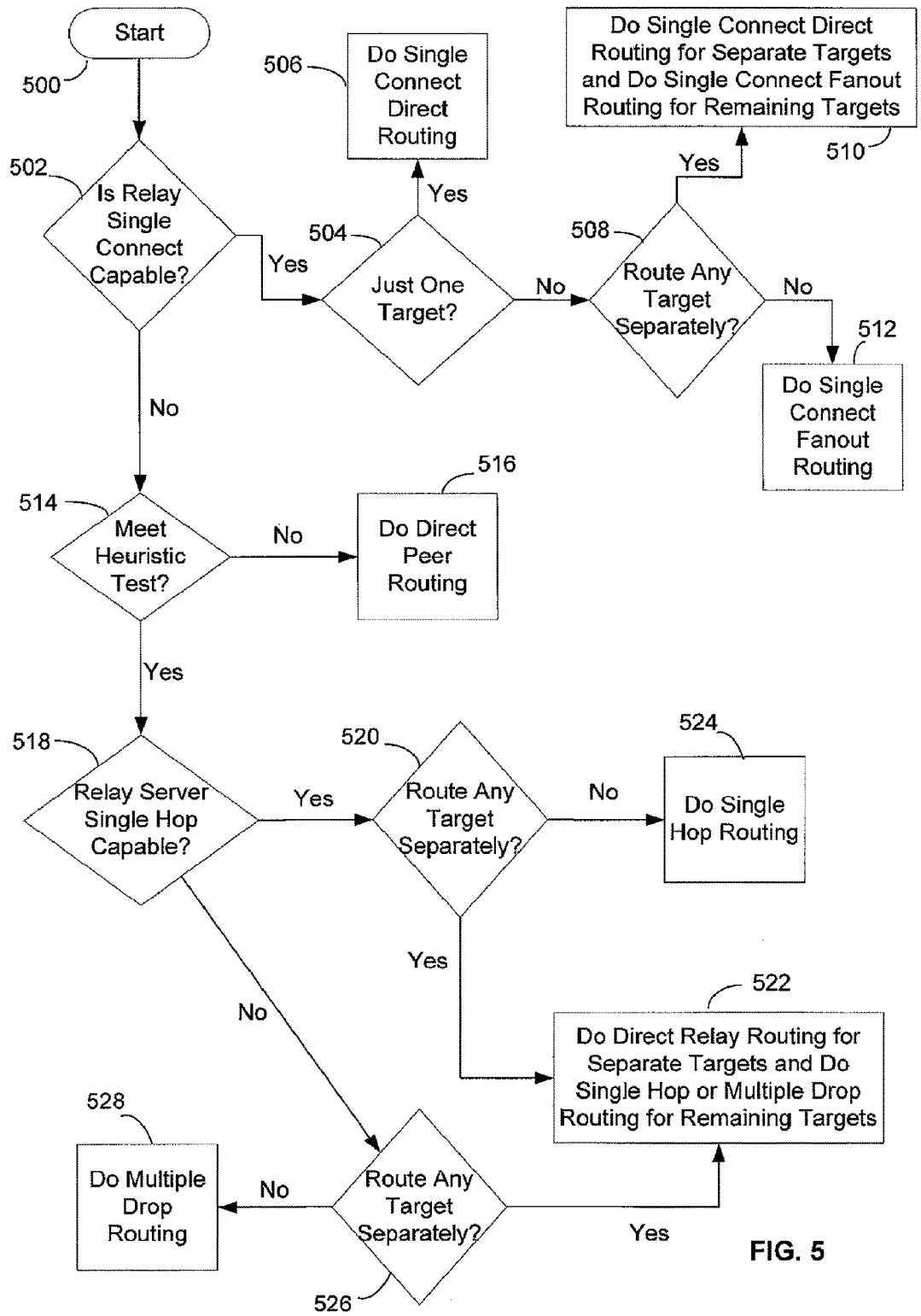
FIG. 5 illustrates a method for an initiating peer to determine an appropriate communication mechanism for sending a message.

FIG. 5 illustrates processing that may be performed for block 406, illustrating a method for an initiating peer to determine appropriate communication mechanisms for target peers in a potential target list. The method may be implemented by the initiating peer in any suitable way by means of any suitable architecture, such as the architecture of FIG. 3. In the embodiment of FIG. 3, some of the functionality expressed in this method may be ascribed to the fanout engine 310, although some functionality may also be ascribed to other components. Regardless of which component of the architecture of the initiating peer implements the method, at block 502, the process may branch depending on whether the home relay server of the initiating peer is capable of supporting single connect routing, perhaps based on the result of its query in block 402.

If its home relay server supports single connect routing, the method then involves checking at block 504 if the destination target list includes only one target that could be used in a session for using single connect routing. Such a determination may be based on checking the home relays associated with target devices in the target list to determine the number of target peers sharing the same home relay. If there is only one target, the initiating peer may choose in block 506 to use single-connect direct routing, as discussed in conjunction with FIG. 2. In scenarios in which there are multiple target peers that do not share a home relay with any other target peer, single connect direct routing may be used to instruct the initiating peer's home relay to forward messages to all such target peers. In that scenario, processing at block 506 may include forming a target list for use in connection with single connect direct routing that identifies each of the target peers for use in a single connect direct routing session with the initiating peer's home relay.

If the destination target list includes more than one target, the initiating peer then may check in block 508 to see if any target should be routed individually, due to a variety of other possible considerations. In some embodiments, any targets on the same LAN as the initiating peer may be routed individually. If so, the initiating peer may choose in block 510 to route messages to any such targets individually using single connect direct routing. The selection of single connect direct routing may be indicated by forming a target list for communication to the initiating peer's home relay identifying the eligible target peers. The processing at block 510 of the peers using single connect direct routing may be similar to that performed in block 506. Some embodiments, in scenarios in which a target list for single connect direct routing is formed in block 506, processing at block 510 may entail adding additional eligible targets to that list in block 510. However, the targets for which single connect direct routing is to be used may be identified and signaled to the home relay server in any suitable way.

Additionally, in block 510, any remaining target peers that are not routed individually using single connect direct routing in block 510 may be routed using single connect fanout routing, as discussed in conjunction with FIG. 2. A target list may be formed for each session over which single connect fanout routing will be used. Each session may include a list of target peers and their associated home relays, which may then be communicated to the initiating peer's home relay for use in processing messages over each session. In some embodiments using single connect fanout routing, the initiating peer may create a single session between itself and its home relay server, and target peers having the same home relay may be grouped and each group may be associated with a separate session between the home relay server of the initiating peer and the home relay server for each group of target peers.

If no targets need to be routed individually, the initiating peer may choose in block 512 to use single connect fanout routing, in which the processing may be similar to that of the remaining peers routed using single connect fanout routing as discussed above in conjunction with block 510.

If the initiating peer determined in block 502 that its home relay server does not support single connect routing, processing may be performed using any other suitable routing type. The routing type may be selected using techniques as are known in the art, or in any other suitable way. For example, in block 514 an initiating peer may perform a heuristic test to determine the optimum communication mechanism. While many tests could be applied, in some embodiments of the invention, the initiating peer attempts to determine if it is faster to send the messages individually. The heuristic algorithm in such embodiments may include computing the expected transmission time based on the size of the message, the number of targets, and the speed of the network connection to the home relay server of the initiating peer. In some embodiments, if the amount of time to send messages individually exceeds a certain threshold, the initiating peer may attempt a communication mechanism in which the messages are sent together via the home relay server of the initiating peer.

Based on the result of the heuristic test performed in block 514, if the initiating peer determines it is faster to send copies of a message individually to each target peer, it may choose to use direct peer-to-peer routing in block 516. Otherwise, it may check in block 518 to see if its home relay server supports single hop routing, as discussed in conjunction with FIG. 2. If its home relay server does support single hop routing, the initiating peer may in block 520 check to see if any target should be routed individually, as discussed above in conjunction with block 508. If so, the initiating peer may choose in block 522 to use direct peer-to-peer routing for any eligible targets. If not, the initiating peer may choose in block 524 to use single hop routing, as discussed in conjunction with FIG. 2.

If the home relay server for the initiating peer does not support single hop routing, the initiating peer may check in block 526 whether any endpoints should be routed separately, as discussed above in conjunction with block 508. If so, the initiating peer may choose in block 522 to use direct relay routing, as discussed in conjunction with FIG. 2, for all separate targets. Additionally, any remaining targets not sent separately may be routed in block 522 using multiple drop routing.

Otherwise, if the process determines at block 526 that no endpoints should be routed separately, the initiating peer may choose in block 528 to use multiple drop routing. In some embodiments of the invention, all relay servers support multiple drop routing as a minimum. At this point, the initiating peer has determined the communication mechanism to be used for sending the message to each target peer on the destination target list, and the method returns back to block 408 in FIG. 4. Though not expressly illustrated in FIG. 5, if a potential target list includes multiple paths for one or more targets, the paths may be considered in any suitable order. For example, the potential paths for each target peer may be considered one at a time or all may be considered at each processing step. For example, at block 512 using single connect fanout routing, target lists are defined based on the target peers sharing the same home relay server. A separate session between the home relay server of the initiating peer and the home relay servers of the target peers may be created for each group of peers sharing the same home relay server. In identifying target peers sharing a relay server, target peers may be deemed to share the same relay server if any path for one of the target peers includes the same relay server as any path to the other target peer. Conversely, in some embodiments, the paths specified for each target peer may be considered sequentially in an order of preference specified as part of the potential target list. In such an embodiment, the path to a target peer will be taken as the first path in the specified order over which communication can be successfully established. In this scenario, two target peers will be deemed to have the same home relay only if the selected paths for both target peers include the same home relays.

As can be seen from the discussion above, the initiating peer favors single connect routing over other communication mechanisms, when it is supported by its home relay server. Compared to the other communication mechanisms discussed above, single connect routing minimizes the usage of computer network resources. Single connect routing limits the number of peer to relay connections since each peer only connects to its own home relays. Single connect fanout further improves resource usage by only sending one copy of the message to its home relay. This reduces the number of copies of the message that must be sent by the sending peer to one.

Figure 6:
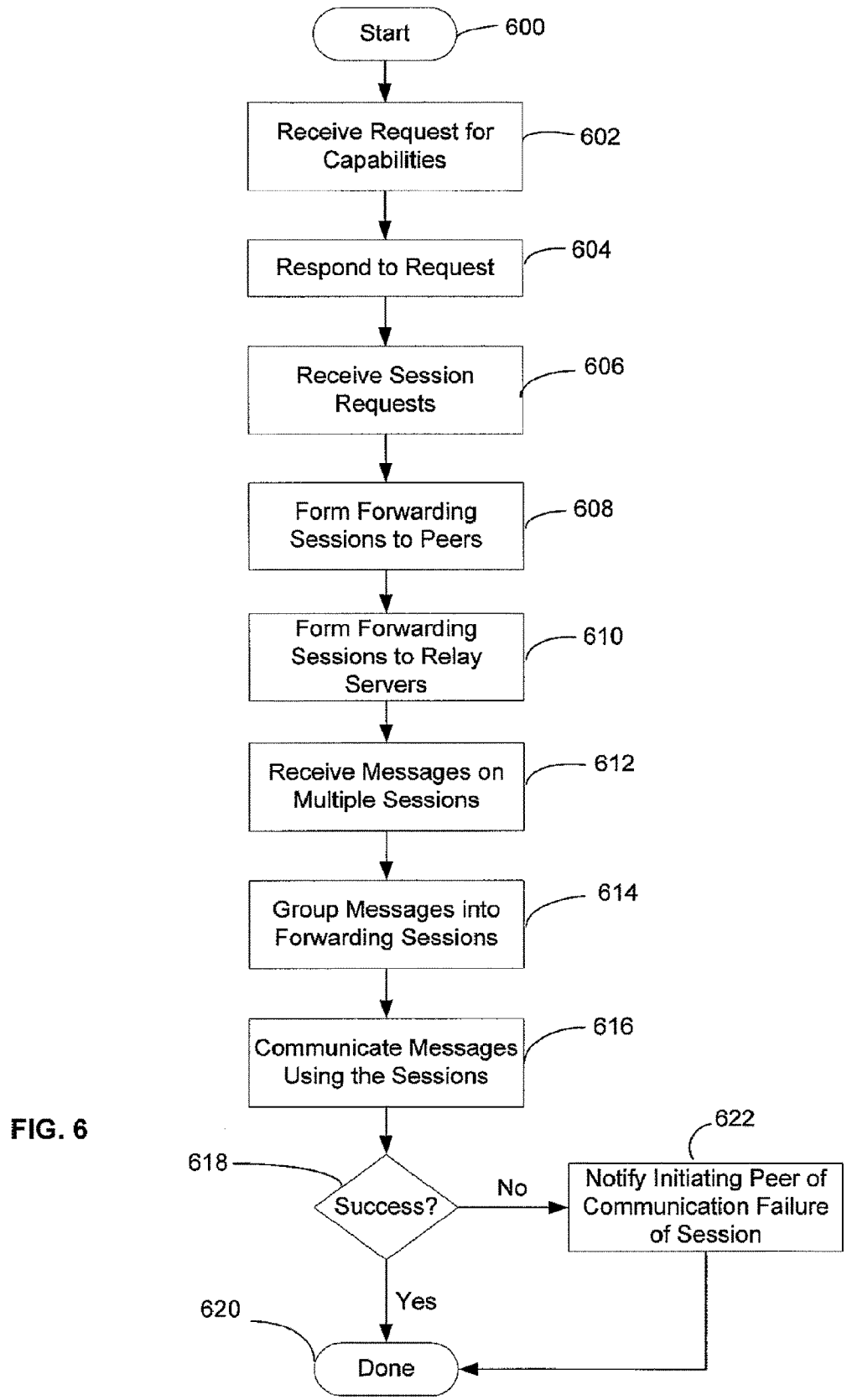
FIG. 6 illustrates a method of operating a relay server according to some embodiments of the invention.

FIG. 6 illustrates one embodiment of a method of implementing the functionality on the relay server required by various communication mechanisms discussed above. As discussed in conjunction with FIG. 2, the relay server may be implemented using any suitable computing device or multiple computing devices configured to act as a cohesive system, whether they act redundantly, or in a load-sharing capacity.

At block 602, the relay server may receive a request from an initiating peer to determine its capabilities. The peer request may also contain information about the initiating peer's routing capabilities. The relay server may respond at block 604 to the request. At block 606, the relay server may receive session requests from one or more initiating peers, wishing to create sessions in order to send messages to other target peers. In block 608, the home relay server may form forwarding sessions for target peers, such as if it is using single connect direct routing, or if it is using single connect fanout routing, but the target peer is unreachable. In block 610, it may form forwarding sessions to relay servers, such as if it is using single connect fanout routing or single hop routing. In some embodiments of the invention, the relay servers may be home relay servers for the target peers in the target peer list of the initiating peer. The nature of the processing performed at block 610 may depend on the routing type used in the sessions established with initiating peers. For example, when single-connect direct routing or single-connect fanout routing is used by the initiating peer, the home relay server for the initiating peer must establish a forwarding session to a target relay server. That forwarding session must include identifying the target peers to which the target relay server is to distribute messages received over the session.

At block 612, the relay server may receive messages on multiple sessions from the initiating peer. The relay server may then, in block 614, distribute the messages via the forwarding sessions it created at blocks 608 and 610. In block 616, the relay server may communicate the messages using the corresponding sessions over any suitable communications medium. In some instances, messages received over multiple inbound sessions may be forwarded using the same forwarding connection. In this way, messages from multiple sessions, even messages from multiple initiating peers, may be communicated over the same connection. Such consolidation of messages is possible, for example, if a relay server receives messages on multiple sessions directed to the same target peer or that are routed through the same target relay server for distribution to the same set of target peers.

In block 618, the process may branch depending on whether communication of a message over each forwarding session was successful. If the message was successfully communicated, in some embodiments, the process may be finished, and the flowchart proceeds to end block 620. If, on the other hand, the communication was not successful, the relay server may notify in block 622 the initiating peer of the communication failure of the session. This notification will allow the initiating peer to respond, perhaps by removing any targets which failed to receive the message into a separate session. The notification sent at block 622 may, in some embodiments, be the same notification received by initiating peer at block 416 (FIG. 4). Having notified the initiating peer, the relay server may be done, and may proceed to end block 620.

Figure 7A:
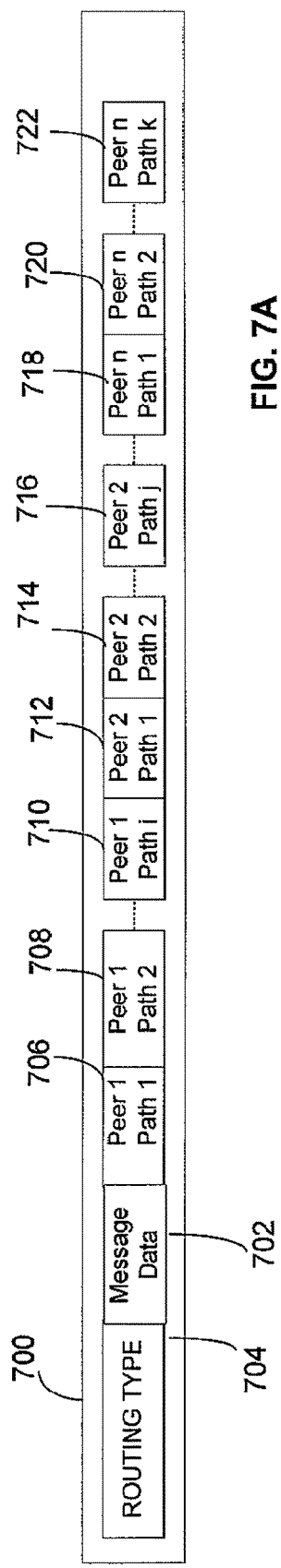
FIG. 7A illustrates an exemplary message that may be sent from an initiating peer to its home relay server in a message format of some embodiments of the invention.

Messages may be sent in any suitable format. FIG. 7A illustrates an exemplary message 700 that may be sent from an initiating peer to its home relay server in a message format of one embodiment of the invention. The embodiments of the invention used by message 700 in FIG. 7A may support communication mechanisms in which the initiating peer may send one copy of a message to its home relay server, having the home relay server forward copies of the message to either target peers or their respective home relay servers. In these embodiments, the relay server of the initiating peer may have knowledge of the communication mechanism desired by the initiating peer. Message 700 may contain the message data 702 desired to be sent by the initiating peer. Message 700 may also contain an indication 704 of the routing type which the initiating peer desires to use, in order to convey this information to its home relay server, for reasons discussed above. Though, in embodiments in which the routing type is communicated to an initiating peer's home relay server as part of establishing a session, the routing type may be omitted from each data message sent to the home relay server for distribution to target peers.

Message 700 may be used in embodiments that also support redundant paths to each target peer. In such embodiments, as discussed in conjunction with FIG. 2, an initiating peer may specify alternate redundant paths by which each target peer may be reached, if any. If the target peer is associated with multiple relay servers, for example, the redundant path information may include all known relay servers with which the target peer is associated. If it fails to deliver the message to the target peer using a first path, the relay server of the initiating peer may use the redundant path information to try delivering the message the target peer via successive alternate paths, until either the message has been successfully delivered to the target peer, or the relay server has exhausted the list of redundant paths provided by the initiating peer in the message 700. In embodiments in which a target list is communicated to an initiating peer's home relay server as part of establishing a session, the target list, including a list of redundant paths for each target peer, may be communicated once as part of establishing a session and omitted from data messages, such as message 700. In other embodiments, the relay server may use the client routing information as a guide in deciding how to best forward messages.

In the exemplary message format of FIG. 7A, target peer 1 has multiple paths, indicated as path 1 . . . path i, specified in the message 700, of which peer 1 redundant paths 706, 708, and 710 are shown. Similarly, target peer 2 has multiple paths in the message 700, of which peer 2 redundant paths 712, 714, and 716 are shown. Multiple target peers may be specified. Accordingly, the example shows paths for peer 1 . . . peer n. In the example of FIG. 7A, target peer n has k redundant paths, three of which are shown in FIG. 7, peer n redundant paths 718, 720, and 722.

If the relay server receiving message 700 fails to successfully deliver message 700 to target peer 2 using the first path, peer 2 redundant path 712, the relay server may try delivering the message using peer 2 redundant path 714. If the message delivery to target peer 2 succeeds using peer 2 redundant path 714, the relay server may then stop attempts to send the message to target peer 2. Additionally, in some embodiments, other messages destined to target peer 2 may continue to be sent using peer 2 redundant path 714 until that path is no longer successful. If, on the other hand, the relay server is not able to successfully deliver the message to peer 2 using redundant path 714, the relay server may successively try each of the redundant paths specified for target peer 2, up to the last redundant path, peer 2 redundant path 716. If the relay server still fails to deliver the message to peer 2 using redundant path 716, it may notify the initiating peer that the delivery of the message to target peer 2 has failed, allowing the initiating peer to take any appropriate action. In other embodiments, the relay server may decide to queue up messages locally until failed targets become reachable.

Figure 7B:
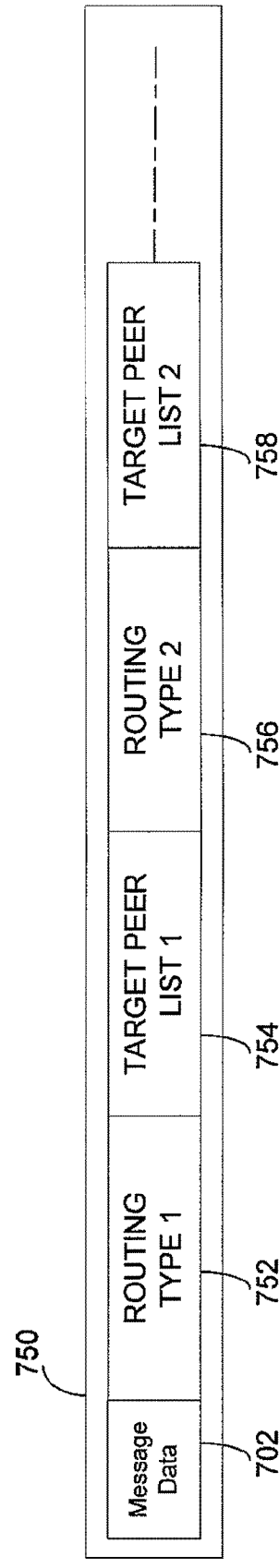
FIG. 7B illustrates an alternative embodiment of exemplary message that may be sent from an initiating peer to its home relay server.

It should be appreciated that the format of message 700 illustrated in FIG. 7A is only one possible representation of the type of information that may be conveyed between an initiating peer and its home relay server. The same type information may be conveyed in alternative ways, including using multiple messages to convey the same type of information. Messages between an initiating peer and its home relay may also contain additional types of information not included in the embodiment of the invention making use of the message format used by message 700. FIG. 7B illustrates an alternative embodiment of a message that may be sent from an initiating peer to its home relay. In the example of FIG. 7B, message 750 may be sent to a relay server when multiple routing types have been identified for target peers in a destination target list. For example, according to the process of FIG. 5, when a relay server supports single connect routing, it is possible that processing at block 510 will identify some target peers for single connect direct routing and processing at block 512 will identify other target peers for single connect fanout routing. Accordingly, multiple routing types may be used for the same message data. In some embodiments, the peers associated with each routing type will be associated with a separate session and a message in the format of message 700 (FIG. 7A) may be used. In other embodiments, a single session between an initiating peer and its home relay server may be used to communicate message data to be forwarded by the home relay server using both single connect direct routing and single connect fanout routing. An example of a suitable message 750 for communicating such information between an initiating peer and its home relay server is illustrated in FIG. 7B. In this example, message 750 includes a field containing message data 702 which may be the same data communicated by message 700 in FIG. 7A. Message 750, however, differs from message 700, in that separate sections of message 750 are provided for each routing type. For example, field 752 may indicate that a first routing type is to be used for forwarding message data 702 to a list of target peers. The list of target peers may be identified in field 754. The list of target peers may be in the same format used in message 700 and may identify the target peers, including redundant paths for one or more of the target peers.

Message 750 may include one or more additional target peer lists and associated routing types to use for forwarding message data 702 to target peers on the list. In the example of FIG. 7B, a second target peer list 758 and a second routing type 756 are illustrated. However, any suitable number of routing types and associated target peer lists may be communicated in a message 750. Each target peer list may generally be of the same format, identifying target peers and one or more routing paths for the target peers.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a relay server in a system using peer to multi-peer routing, to perform a method comprising:

receiving a request;
responding to the request;
receiving a target list identifying target peer devices and a plurality of alternative paths for reaching each target peer device in at least a portion of the target peer devices; and
with a computing device, distributing a message in accordance with the target list using a selected path from the plurality of alternative paths for each target peer device.

2. The method of claim 1, wherein the method further comprises:
when the message fails upon distribution to a target peer device in the target list using the selected path, distributing the message using an alternative path from the plurality of alternative paths for the target peer device which is different from the selected path.

3. The method of claim 2, wherein distributing a message in accordance to the target list further comprises creating a first session associated with distributing the message.

4. The method of claim 3, wherein the relay server comprises a home relay server, the message comprises a first message from a first initiating peer, and wherein the target peer devices are associated with one or more target relay servers, and the method further comprises:
creating a forwarding session between the home relay server and each target relay server of the one or more target relay servers; and
receiving a second message from a second initiating peer; and
forwarding the first message and the second message to a target relay server multiplexed in the same forwarding connection.

5. The method of claim 3, wherein the method further comprises:
when the message fails to be distributed to the target peer device using all the paths from the plurality of alternative paths for the target peer device, then creating a second session associated with distributing the message to the target peer device, and disassociating the target peer device from the first session.

6. The method of claim 1, wherein receiving the request comprises receiving a request to determine whether the relay server supports single connection distribution of messages, and wherein responding to the request comprises responding with an indication whether the relay server supports single connection distribution of messages.

7. A computer storage medium, that is not a propagating signal, encoded with computer executable instructions that, when executed, control a relay server in a computer system employing peer to multi-peer routing, to perform a method comprising:
receiving a request;
responding to the request;
receiving a target list identifying target peer devices and alternative paths for reaching each target peer device of at least a portion of the target peer devices; and
distributing a message in accordance with the target list using a selected path from the alternative paths for each target peer device.

8. The computer storage medium of claim 7, wherein:
the request comprises a request for routing capabilities of the relay server; and
responding to the request comprises sending a response indicating routing capabilities of the relay server.

9. The computer storage medium of claim 7, wherein the method further comprises:
when the message fails upon distribution to a target peer device in the target list using the selected path, distributing the message using an alternative path from the alternative paths for the target peer device which is different from the selected path.

10. The computer storage medium of claim 9, wherein distributing a message in accordance to the target list further comprises creating a first session associated with distributing the message.

11. The computer storage medium of claim 10, wherein the relay server comprises a home relay server, the message comprises a first message from a first initiating peer, and wherein the target peer devices are associated with one or more target relay servers, and the method further comprises:
creating a forwarding session between the home relay server and each target relay server in the one or more target relay servers; and
receiving a second message from a second initiating peer; and forwarding the first message and the second message to a target relay server multiplexed in the same forwarding connection.

12. The computer storage medium of claim 10, wherein the method further comprises:
when the message fails to be distributed to the target peer device using all the paths from the alternative paths for the target peer device, then creating a second session associated with distributing the message to the target peer device, and disassociating the target peer device from the first session.

13. The computer storage medium of claim 7, wherein receiving the request comprises receiving a request to determine whether the relay server supports single connection distribution of messages, and wherein responding to the request comprises responding with an indication whether the relay server supports single connection distribution of messages.

14. A system comprising:
at least one relay server, each of the at least one relay servers configured for performing peer-to-multi-peer routing according to a method comprising:
receiving a request;
responding to the request;
receiving a target list identifying target peer devices and a plurality of alternative paths for reaching each target peer device in at least a portion of the target peer devices; and
distributing a message in accordance with the target list using a selected path from the plurality of alternative paths for each target peer device.

15. The system of claim 14, further comprising:
a plurality of peers.

16. The system of claim 15, wherein:
each of the plurality of peers is configured for operating as an initiating peer to send a message to a plurality of target peer devices, the initiating peer device being connected to an initiating local area network and being associated with an initiating home relay server and the plurality of target devices each being associated with a target home relay server, the initiating peer configured to send the message according to a method comprising:
obtaining a first target peer list and each target peer's home relay list;
selecting a distribution mechanism for each target peer on the first target peer list, the selecting comprising:
when the first target peer list comprises a single target peer, selecting as the distribution mechanism a communication mechanism comprising single connection communication from the initiating peer to its home relay, wherein when the target peer's home relay is different than the initiating peer's home relay, the distribution mechanism further comprises a communication mechanism from the initiating peer's home relay to the target peer's home relay and a communication mechanism from the target peer's home relay to the single target peer; and when the first target peer list comprises a plurality of target peers:

selecting as the distribution mechanism for each of the plurality of target peers that have the same home relay as the initiating peer a distribution mechanism comprising single connection communication from the initiating peer to its home relay and from that home relay to the plurality of target peers; and selecting as the distribution mechanism for each remaining target peer on the first target peer list that does not have the same home relay as the sending peer a distribution mechanism comprising single connection communication from the initiating peer to its home relay and from that home relay to the home relay of each of the remaining target peers and from the home relay associated with each of the remaining target peers to each remaining target peer from its associated home relay.

* * * * *